United States Patent Office 2,931,507
Patented Apr. 5, 1960

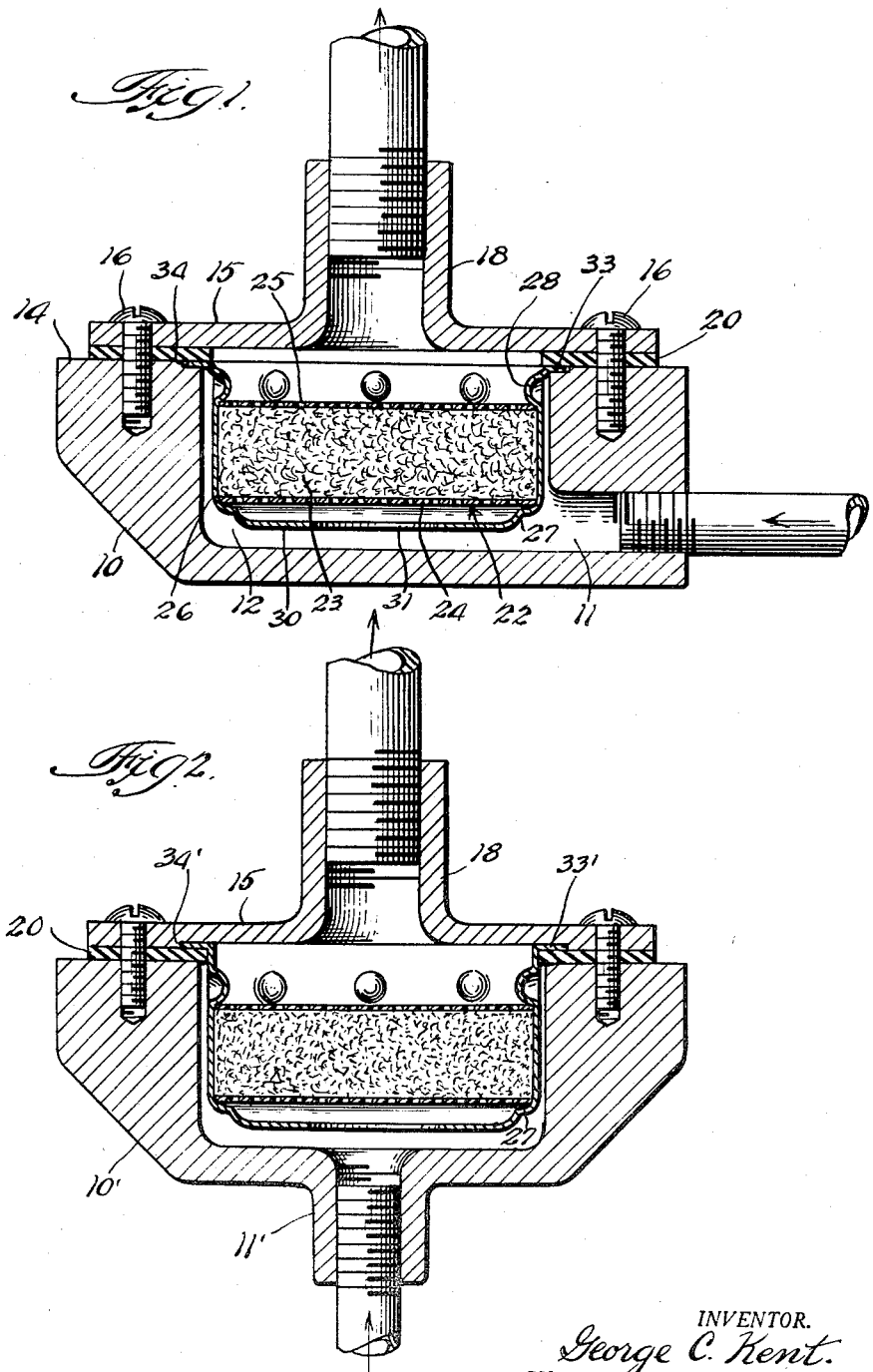

2,931,507
FILTER CONSTRUCTION

George C. Kent, Elmhurst, Ill., assignor, by mesne assignments, to Controls Company of America, Schiller Park, Ill., a corporation of Delaware Application November 17, 1955, Serial No. 547,381

3 Claims. (Cl. 210—445)

This invention relates to a filter construction, and particularly to a filter construction for use with fluids such as air, other gases, water, oil, gasoline, and the like, having a replaceable filter element.

Filtering of a fluid is usually accomplished by forcing the same under pressure through a medium having fine pores or passageways therethrough, the pores or passages being fine enough to trap gum, dirt and other solid particles which are to be removed from the fluid, but permitting the passage of clean fluid therethrough. It is clear that the operation of a filter depends upon the maintenance of a pressure differential between the inlet and outlet sides of the filter medium. It is therefore essential that the filter medium be mounted or disposed in such manner that no fluid by-paths around the filter are possible under the operating pressures of the filter system.

Many filters are made in the form of a can or container in which the filter medium is disposed, the can or container having fittings at the two ends or at two ports thereof constituting the fluid inlet and outlet passages. While such filters are highly efficient, they are inherently expensive since the fittings for connection to fluid lines form an integral part of the filter structure.

In an attempt to reduce the cost of filters as described above, fittings have been removed and the filter medium has been constructed in the form of a cartridge. Such a cartridge is designed to be used with a suitable container having inlet and outlet pipes or fittings. However, in order to avoid the creation of shunt paths around the cartridge, it has been necessary to provide gaskets and machined surfaces for the gaskets, all these tending to increase the cost of the cartridge.

In accordance with the present invention, a filter and filter cartridge are provided having such a construction as to require no close tolerances or finely machined parts on the filter cartridge while eliminating the possibility of leakage by-paths being created when the filter is being used. A construction embodying the present invention is characterized by mechanical simplicity and is susceptible to manufacture by simple stamping operations. The replaceable elements including the filter medium and gasket may be constructed in a simple manner and are free from all requirements of any substantial accuracy as far as dimensions are concerned.

For a more thorough understanding of the invention reference will now be made to the drawing, wherein an exemplary embodiment illustrative of the invention is shown, it being understood that variations may be made without departing from the scope of the invention except as defined by the appended claims.

Referring to the drawings, Fig. 1 shows a transverse sectional elevation through the center of a filter embodying the present invention; and Fig. 2 is a sectional elevation similar to Fig. 1 but showing a modification with the inlet at a different position.

Referring first to Figs. 1 and 2, the filter comprises body 10 of suitable solid material, such as metal, or of molded material, such as a plastic. Body 10 has inlet passage 11 and chamber or cavity 12. Body 10 has machined or finished face 14, part of body 10 being removed to give access to cavity 12.

Face 14 is provided with cover 15 suitably attached to body 10 by bolts 16. As many bolts 16 may be provided as will be necessary to maintain cover 15 tightly against body 10. In practice, cavity 12 will have a circular cross-section and cover 15 and body 10 may be circular in plan. This, however, may be varied so that non-circular shapes may be used. Cover 15 has sleeve portion 18 formed as a part thereof, such sleeve portion being internally threaded. Sleeve 18 faces cavity 12 and preferably the diameter of sleeve 18 is substantially smaller than the diameter of cavity 12. Thus cover plate 15 will have a cover portion extending inwardly of the cavity sides. The portion of cover 15 overlying face 14 is preferably smooth or finished.

In order to provide a fluid-tight seal between cover 15 and face 14, gasket 20 between the opposing smooth surfaces of cover plate 15 and body 10 is provided. This gasket may be of suitable material such as leather, asbestos, rubber (natural, synthetic or a combination of the two), or any other material.

A removable and replaceable filter unit generally indicated by 22 is disposed within chamber 12 of body 10. Filter unit 22 consists of filter element proper 23, which may be compacted material such as cotton, wool, porous stone, or any other material used for filtering purposes. Filter element 23 is preferably disposed between screens 24 and 25 for preventing migration of the filter material. Screens 24 and 25 are of suitable material such as iron mesh or copper mesh or may be of plastic mesh or any other material, or may, in fact, be of woven cloth such as cotton or linen. Supporting filter element 23 and screens 24 and 25 is sheet metal retainer 26 having straight sides with inwardly extending annular portion 27 at the bottom end. Dimples 28 are disposed in an annular zone at the top. Retainer 26 has inwardly extending annular portion 27 continuing as annular strip 30 providing larger aperture 31 for ingress of fluid and annular region for ready access to the entire bottom surface of the filter medium.

Dimples 28 of the filter retainer hold screen 25 firmly in position against any force tending to displace the filter medium upwardly within the retainer. If desired, the dimples may be replaced by an annular bowed region. Filter retainer 26 has marginal mounting flange 33 extending beyond dimples 28, the mounting flange extending generally straight outwardly from the retainer.

The screens and filter proper may be held within retainer 26 by means other than inwardly extending portion 27 and dimples 28.

Retainer 26 is made of suitable sheet material such as sheet iron or steel, brass, copper, aluminum, or any other material sufficiently strong and capable of being drawn or spun or molded into shape. Marginal flange portion 33 of the filter medium retainer extends into annular recess 34 formed in surface 14, as illustrated in Fig. 1. It is desirable that recess 34 for accommodating marginal portion 33 have a depth as measured from surface 14 of body 10 generally equal to the thickness of annular flange 33 of retainer 26. Due to the compression of gasket 20 there will be a tendency for the gasket to cooperate with flange 33 irrespective of whether flange 33 is somewhat thicker or somewhat thinner than the depth of recess 34. Within the usual tolerances in stamping, molding or die-casting, gasket 20 will always provide a fluid-tight seal after being compressed by drawing the bolts tight. The gasket will, of course, be substantially thicker than the difference in thickness between flange 33 and the depth of recess 34.

It is understood that the diameter of recess 34 will always be greater than the diameter of flange 33 so that flange 33 will always lie within the recess circumference.

The replacement of filter unit 22 may be accomplished by removing top plate 15 and gasket 20. The removal of filter unit 22 from body 10 and replacement thereof may be readily accomplished, after which top plate 15 may be bolted into position. It is clear that filter unit 22 as a replaceable element need not be constructed with any fine tolerances.

It is possible to reverse the flow of liquid through the entire filter and have the liquid inlet at sleeve 18 and a liquid outlet at passage 11.

Referring to Fig. 2, a modified construction is shown wherein body 10' has passage 11' extending substantially in line with sleeve 18 of the cover plate. In practice, the filter described here may be provided with any desired inlet and outlet passages which may be located in any desired relation. As a rule, all filter bodies will have a cover plate corresponding to cover plate 15 and will have gasket 20 for sealing the same to the body. It will thus be apparent that the removable and replaceable filter unit may be used with a wide variety of filter constructions. In particular, annular inturned portion 27 of the filter retainer may be used with an O-ring gasket in a filter body construction where an annular seal may be desirable at this region.

It is also possible to have annular recess 34' formed in mounting plate 15. In such case, gasket 20 will be below flange 33' of the filter retainer. The filter unit for Fig. 2 may be identical with that for Fig. 1. It is possible to use a gasket on each face of flange 33 and eliminate recess 34 or 34'.

What is claimed is:

1. A filter construction comprising a filter body having a flat face and a cavity in said body extending inwardly from said face, a cover plate for said body face, means for attaching said cover plate to said body, a gasket between said cover plate and body, said cover plate and body having smooth faces opposed to each other with the gasket therebetween, one of said faces having a recess formed therein bordering the cavity, a readily removable and replaceable filter unit comprising a retainer open at either end and having inner and outer wall surfaces, said filter unit having a filter medium within said retainer, said retainer having an integral continuous peripheral flange for positioning in said recess, spaced inwardly directed portions on the inner wall surface around the top of said retainer and an inwardly directed annular portion on the inner wall surface at the bottom of said retainer for holding said filter medium in position and to provide for ready access of fluid to the entire bottom surface of the filter medium, said cover plate and body having passages for fluid flow to and from the chamber, and said flange of said retainer being seated against said gasket and clamped between said cover plate and body to provide a tight seal, whereby fluid passing to and from said chamber must pass through the filter medium.

2. The construction according to claim 1 wherein said recess is in the filter body.

3. The construction according to claim 1 wherein said recess is in the cover plate.

References Cited in the file of this patent

UNITED STATES PATENTS

| | | |
|---|---|---|
| 524,827 | Jones | Aug. 21, 1894 |
| 1,442,787 | Scheminger | Jan. 16, 1923 |
| 1,763,863 | Richheimer | July 17, 1930 |
| 1,830,664 | Kracklauer | Nov. 3, 1931 |
| 2,131,933 | Brock | Oct. 4, 1938 |
| 2,563,548 | Plante | Aug. 7, 1951 |
| 2,598,818 | Muirhead | June 3, 1952 |